United States Patent
Taherzadeh Boroujeni et al.

(10) Patent No.: US 11,678,204 B2
(45) Date of Patent: Jun. 13, 2023

(54) USER EQUIPMENT INITIATED COVERAGE ENHANCEMENT REQUESTS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 104 days.

(21) Appl. No.: 17/332,840

(22) Filed: May 27, 2021

(65) Prior Publication Data

US 2021/0377749 A1 Dec. 2, 2021

Related U.S. Application Data

(60) Provisional application No. 63/030,816, filed on May 27, 2020.

(51) Int. Cl.
*H04W 24/10* (2009.01)
*H04W 16/28* (2009.01)
*H04W 24/02* (2009.01)

(52) U.S. Cl.
CPC .......... *H04W 16/28* (2013.01); *H04W 24/02* (2013.01); *H04W 24/10* (2013.01)

(58) Field of Classification Search
CPC ..... H04W 16/28; H04W 24/02; H04W 24/10; H04W 52/343; H04W 52/42; H04W 24/08; H04B 7/0617; H04B 7/063; H04B 17/318
See application file for complete search history.

(56) References Cited

U.S. PATENT DOCUMENTS

2021/0320710 A1* 10/2021 Koskela ............... H04B 17/309
2022/0311488 A1* 9/2022 Shreevastav ......... H04B 7/0408

* cited by examiner

*Primary Examiner* — Chuong A Ngo
(74) *Attorney, Agent, or Firm* — Loza & Loza, LLP

(57) ABSTRACT

Various aspects pertain to a method for a UE to unilaterally initiate a request to a serving base station to change or enhance beam coverage at the UE. The UE may measure one or more characteristics of a directional beam transmitted by the base station and determines whether channel reliability for the beam should be improved. If channel reliability is below a threshold, then the UE may transmit a request to the base station seeking to adjust coverage of the beam (such as coverage enhancements). Such request may seek to adjust one or more transmit or receive parameters associated with the beam or channels transmitted therein. The UE may switch to using a pre-defined set of coverage enhancement parameters or procedures either automatically after transmitting the request or upon receipt of a grant by the base station.

28 Claims, 8 Drawing Sheets

USER EQUIPMENT INITIATED COVERAGE ENHANCEMENT REQUESTS

CROSS-REFERENCE TO RELATED APPLICATIONS

This application for patent claims priority to and the benefit of provisional patent application No. 63/030,816 entitled "UE-Initiated Coverage Enhancement Requests" filed in the United States Patent and Trademark Office on May 27, 2020, the entire content of which is incorporated herein by reference as if fully set forth below in its entirety and for all applicable purposes.

TECHNICAL FIELD

The disclosure relates generally to wireless communication, and more specifically, to providing beam coverage enhancement where a user equipment initiates beam reliability feedback to a transmitting base station.

DESCRIPTION OF THE RELATED TECHNOLOGY

As the demand for mobile broadband access increases, research and development continue to advance wireless communication technologies that employ orthogonal frequency-division multiplexing (OFDM), not only to meet the growing demand for mobile broadband access, but to advance and enhance the user experience with mobile communications.

Currently, 5G communication technologies seek to increase download speeds by increasing bandwidth through the use of higher frequency ranges. For instance, in 5G the New Radio (NR) air interface has been defined within 3GPP to include two different frequency ranges. A first frequency range (FR1) may include sub-6 GHz frequency bands, some of which are bands traditionally used by previous mobile communication standards, but FR1 may be extended to cover a frequency spectrum from 410 MHz to 7125 MHz. A second frequency range (FR2) may include frequency bands from 24.25 GHz to 52.6 GHz. Generally, bands in FR2 have shorter range/distance but have higher available bandwidth than bands in FR1. To decrease propagation loss of the radio waves and increase the transmission distance, beamforming is implemented in 5G communication systems where massive multiple-input multiple-output (MIMO) antennas are used to provide one or more directional beams. In contrast to a typical single omni-directional beam, which broadcasts a radio signal in all directions, beamforming allows radio signal energy to be directed to a user equipment (UE) or groups of UEs along a particular direction. The use of directional beams in 5G increases the resiliency (for example, signal-to-noise ratio (SNR)) of a transmitted signal and the channel capacity, without increasing spectrum usage. However, 5G beamforming performance is impacted by various factors including temperature, humidity, penetration losses, among other examples.

While 5G communication systems provide periodic feedback reporting of channel state information from a UE to a base station, such reporting may not be frequent enough to detect sudden or sporadic degradation of the directional beam or channels transmitted thereon.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect provides a method for wireless communication by a user equipment (UE) that receives a directional beam broadcasted by a base station. For instance, one or more unicast channels (such as, in the 24 GHz to 53 GHz frequency range) may be broadcasted by the base station within the beam.

The UE may then perform measurements of the beam and determines a channel reliability for the beam based on the measurements. A request may then be transmitted by the UE to the base station for a coverage enhancement of the beam responsive to determining that the channel reliability for the beam is below a threshold. In one example, the request may be asynchronously transmitted from the UE to the base station. One example of determining channel reliability for the beam includes comparing one or more beam measurements to corresponding thresholds associated with one or more beam characteristics.

In response, the UE may receive an indication from the base station granting the UE use of coverage enhancement parameters or procedures. The UE may then adjust reception or processing of the beam for a coverage enhancement of the beam based on a set of coverage enhancement parameters or procedures. In one implementation, adjusting reception or processing of the beam may occur before a grant to the request is received from the base station.

In one example, adjusting reception or processing of the beam may include transmitting channel state information with additional information related to channel reliability for one or more channels within the beam. In another example, adjusting reception or processing of the beam may include increasing a frequency of acknowledgements to the base station for one or more channels within the beam.

In one implementation, the UE may store a plurality of coverage enhancement parameters or procedures at the UE. An indication may be subsequently received by the UE from the base station specifying a subset of the plurality of coverage enhancement parameters or procedures to adjust reception or processing of the beam.

In another example implementation, the coverage enhancement of the beam may be terminated upon the occurrence of one of: (a) elapsing of a preconfigured duration of time; or (b) receiving an indication from the base station to terminate the coverage enhancement of the beam.

In an alternative implementation, the UE may receive a beam change indication from the base station to change reception to a different beam. Consequently, the UE may terminate the coverage enhancement of the beam based on changing reception to the different beam.

Another aspect provides a wireless user equipment (UE), comprising at least one processor; and at least one memory communicatively coupled with the at least one processor. The at least one memory may store processor-readable code that, when executed by the at least one processor, is configured to: (a) receive a directional beam transmit or broadcasted by the base station; (b) perform measurements of the beam; (c) determine a channel reliability for the beam based on the measurements; (d) transmit a request to the base station for a coverage enhancement of the beam responsive to determining that the channel reliability for the beam is below a threshold; and (e) adjust reception or processing of the beam according to a set of coverage enhancement parameters or procedures.

Yet another aspect provides a non-transitory processor-readable medium storing executable instructions, which when executed by one or more processors, causes one or more processors to: (a) receive a directional beam transmit or broadcasted by a base station; (b) perform measurements of the beam; (c) determine a channel reliability for the beam based on the measurements; (d) transmit a request to the base station for a coverage enhancement of the beam responsive to determining that the channel reliability for the beam is below a threshold; and (f) adjust reception or processing of the beam according to a set of coverage enhancement parameters or procedures.

According to another aspect provides a method for wireless communications by a base station that transmits or broadcasts a directional beam including one or more channels. In one example, the one or more channels may be unicast channels (such as, in the 24 GHz to 53 GHz frequency range) transmitted or broadcasted by the base station within the beam. Subsequently, the base station may receive a request from a user-equipment (UE) seeking coverage enhancement of the beam. Consequently, the base station may transmit an indication to the UE granting or denying the coverage enhancement request. If the request is granted, the base station may adjust one or more characteristics of the beam prior to retransmission or re-broadcasting. In one example, the base station may determine to deny the coverage enhancement request if a beam switch is scheduled to occur within a threshold amount of time. According to one feature, the base station may also transmit an indication from the base station specifying a subset of the plurality of coverage enhancement parameters or procedures to adjust reception or processing of the beam.

Subsequently, the base station may receive a channel state information with additional information related to channel reliability for the one or more channels from the UE in response to granting of the request.

In various examples, the base station may terminate coverage enhancement of the beam by (a) transmitting an indication to the UE to terminate coverage enhancement or (b) transmitting a beam change indication to the UE to change reception to another beam-formed signal including the one or more channels.

Yet another aspect provides a base station, comprising at least one processor and at least one memory communicatively coupled with the at least one processor. The at least one memory storing processor-readable code that, when executed by the at least one processor, is configured to: (a) transmit or broadcast a directional beam including one or more channels; (b) receive a request from a user-equipment (UE) seeking coverage enhancement of the beam; (c) transmit an indication to the UE granting or denying the coverage enhancement request; and (d) adjust one or more characteristics of the beam prior to retransmission or re-broadcasting.

In yet another aspect, a non-transitory processor-readable medium stores executable instructions, which when executed by one or more processors, causes one or more processors to: (a) transmit or broadcast a directional beam including one or more channels; (b) receive a request from a user-equipment (UE) seeking coverage enhancement of the beam; (c) transmit an indication to the UE granting or denying the coverage enhancement request; and (d) adjust one or more characteristics of the beam prior to retransmission or re-broadcasting.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
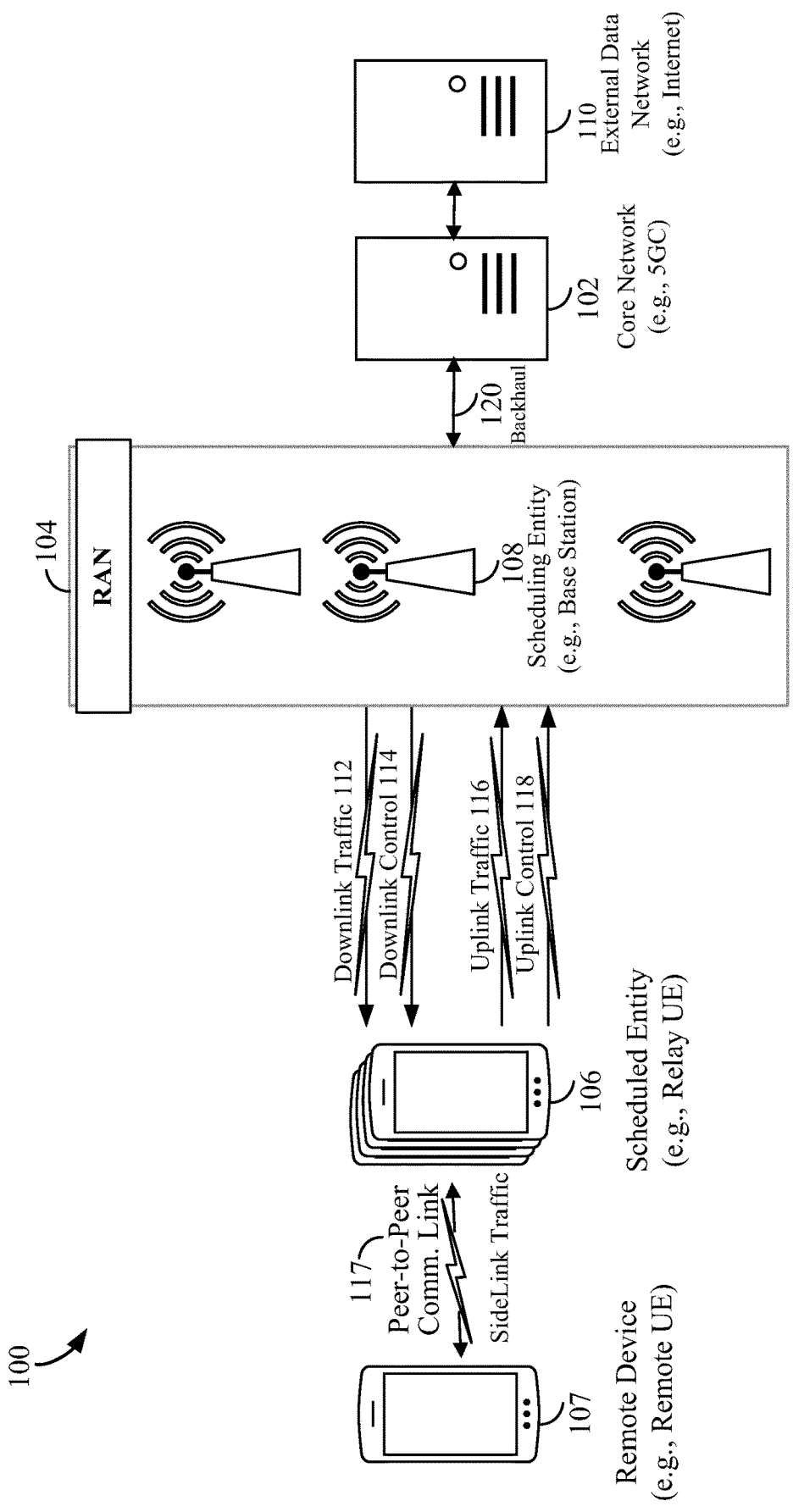
FIG. 1 is a schematic illustration of an example wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure relate to providing beam coverage enhancement where a user equipment initiates beam reliability feedback to a transmitting base station. According to some aspects, a user equipment (UE) monitors the reception quality of a beam (or channels transmitted thereon) and determines a channel reliability based on the reception quality, which it then compares to a threshold. In particular aspects, responsive to determining that the channel reliability is below the threshold, the UE transmits a coverage enhancement request to the serving base station. The coverage enhancement request indicates a desire or intention of the UE to change one or more parameters or procedures used to receive the beam. In some such examples, the UE may seek to modify how the UE attempts to receive or recover information from channels within the beam (such as by increasing multi-path signal processing). In some other examples, the UE may seek to cause the base station to modify some characteristics of the beam (such as a transmission power or number of repetitions, among other examples) without actually triggering a beam change (also referred to as a "beam switch").

Particular aspects of the subject matter described in this disclosure can be implemented to realize one or more of the following potential advantages. In some examples, the described techniques can be used to enable a UE to unilaterally and asynchronously provide beam quality feedback to the base station in scenarios in which beam reception conditions may dynamically change quickly and in which other regularly-scheduled feedback reports may be insufficient to capture such changes.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects or uses may come about via integrated chips and other non-module-component based devices (such as, end-user devices, vehicles, communication devices, computing devices, industrial equipment, retail/purchasing devices, medical devices, AI-enabled devices, among other examples). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (such as, hardware components including antenna, RF-chains, power amplifiers, modulators, buffer, processor(s), interleaver, adders/summers, among other examples). It is intended that innovations described herein may be practiced in a wide variety of devices, chip-level components, systems, distributed arrangements, end-user devices, among other examples, of varying sizes, shapes and constitution.

For wireless communication systems that support user equipment (UE) devices with reduced number of receiving antennas, one solution to the potential coverage loss on downlink channels may be to use repetition at an intra-slot level. That is, a downlink control channel may be repeated one or more times within defined monitoring occasions in a slot to permit a receiving user device to enhance or improve reception coverage.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and user equipment (UE) 106 and 107. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, such as, corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer or wearable device, such as eyewear, a wearable camera, a virtual reality device, a smart watch, a health or fitness tracker, a digital audio player (such as, MP3 player), a camera, a game console, among other examples. A mobile apparatus may additionally be a digital home or smart home device such as a home audio, video, or multimedia device, an appliance, a vending machine, intelligent lighting, a home security system, a smart meter, among other examples. A mobile apparatus may additionally be a smart energy device, a security device, a solar panel or solar array, a municipal infrastructure device controlling electric power (such as, a smart grid), lighting, water, among other examples; an industrial automation and enterprise device; a logistics controller; agricultural equipment; military defense equipment, vehicles, aircraft, ships, and weaponry, among other examples. Still further, a mobile apparatus may provide for connected medicine or telemedicine support, such as, health care at a distance. Telehealth devices may include telehealth monitoring devices and telehealth administration devices, whose communication may be given preferential treatment or prioritized access over other types of information, such as, in terms of prioritized access for transport of critical service data, or relevant QoS for transport of critical service data.

Wireless communication between a RAN 104 and a UE 106 may be described as utilizing an air interface. Transmissions over the air interface from a base station (such as, base station 108) to one or more UEs (such as, UE 106) may be referred to as downlink (DL) transmission. In accordance with certain aspects of the present disclosure, the term downlink may refer to a point-to-multipoint transmission originating at a scheduling entity (described further below; such as, base station 108). Another way to describe this scheme may be to use the term broadcast channel multiplexing. Transmissions from a UE (such as, UE 106) to a base station (such as, base station 108) may be referred to as uplink (UL) transmissions. In accordance with further aspects of the present disclosure, the term uplink may refer to a point-to-point transmission originating at a scheduled entity (described further below; such as, UE 106).

In some examples, access to the air interface may be scheduled, where a scheduling entity (such as, a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (such as, one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (such as, a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (such as, 5GC). In other examples, the core network 102 may be configured according to a 4G evolved packet core (EPC), or any other suitable standard or configuration.

In some implementations, the scheduled entity 106 may establish a peer-to-peer communication link 117 with a remote device 107 (such as, remote UE). The remote device 107 may then use the peer-to-peer communication link 117 to establish a communication session with the RAN 104. In such configuration, the scheduled entity 106 may serve as a relaying UE to facilitate communications between the remote device 107 and the RAN 104.

Figure 2:
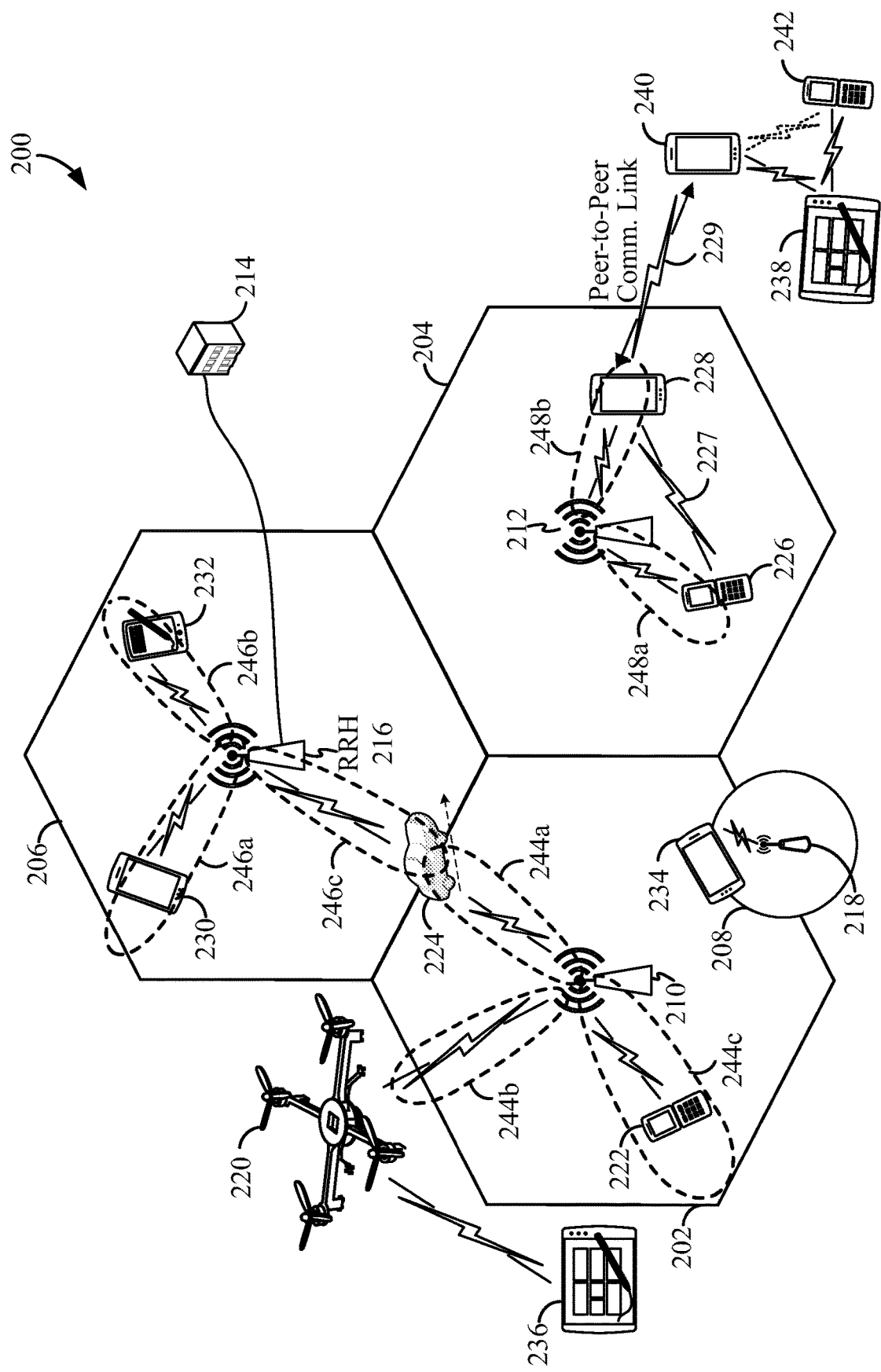
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. Each base station 210, 212, 216 may employ beamforming to form directional beams 244a, 244b, 244c, 246a, 246b, 246c, 248a, and 248b through which it transmits one or more channels to each served UE. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (such as, a microcell, picocell, femtocell, home base station, home Node B, home eNode B, among other examples) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, or 242 may be the same as the UE/scheduled entity 106 or remote device 107 described above and illustrated in FIG. 1.

In some examples, a mobile network node (such as, quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (such as, UEs 226 and 228) may communicate with each other using peer to peer (P2P) or sidelink signals 227 without relaying that communication through a base station (such as, base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (such as, secondary) sidelink device. In still another example, a UE may function as a scheduling entity in a device-to-device (D2D), peer-to-peer (P2P), or vehicle-to-vehicle (V2V) network, or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The base stations (also referred to as scheduling entities) and UEs (also referred to as scheduled entities) may include multiple antennas that may support spatial multiplexing. Spatial multiplexing may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the base stations and UEs may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

The base stations and UEs that include multiple antennas may also support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may then generate a precoding (or "steering") matrix for the beamformee based on the feedback and use the steering matrix to precode the data streams to configure the amplitudes and phase shifts for subsequent transmissions to the beamformee.

As described above, a transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions by increasing the number of transmit antennas. This is especially advantageous in MU transmission contexts in which it is particularly important to reduce inter-user interference.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

According to one aspect, some UEs may establish peer to peer communication links 227 and 229. For instance, remote UEs 226, 240 and 238 and relay UEs 228 may establish such peer to peer communication links, which may then enable the remote UEs to establish communication sessions with the mobile network (such as, base stations 210, 212, and 214) through the relay UEs. While the remote UEs and relay UEs may negotiate and establish the peer to peer communication links 227 and 229 on their own, the mobile network may provide or contribute information to secure communications over the peer to peer communication link. In other implementations, the peer to peer communication links 227 and 229 may be secured by a pre-shared key known to the remote UE and the relay UE.

In various aspects of the disclosure, a radio access network 200 may utilize DL-based mobility or UL-based mobility to enable mobility and handovers (that is, the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (such as, unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (such as, UE 224) may be concurrently received by two or more cells (such as, base stations 210 and 214/216) within the radio access network 200. Each of the cells may measure a strength of the pilot signal, and the radio access network (such as, one or more of the base stations 210 and 214/216 or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators or multiple RATs. For example, the holder of a license for a portion of licensed spectrum may provide licensed shared access (LSA) to share that spectrum with other parties, such as, with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can transmit information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, such as, several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

As referred to within the present disclosure, a frame may refer to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an example downlink subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE. In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 millisecond (ms) subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (such as, one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (such as, the PDCCH), and the data region 314 may carry data channels (such as, PDSCH or PUSCH). Of course, a slot may contain all DL, all UL, or at least one DL portion and at least one UL portion. The structure illustrated in FIG. 3 is merely example in nature, and different slot structures may be utilized, and may include one or more of each of the control region(s) and data region(s).

Figure 3:
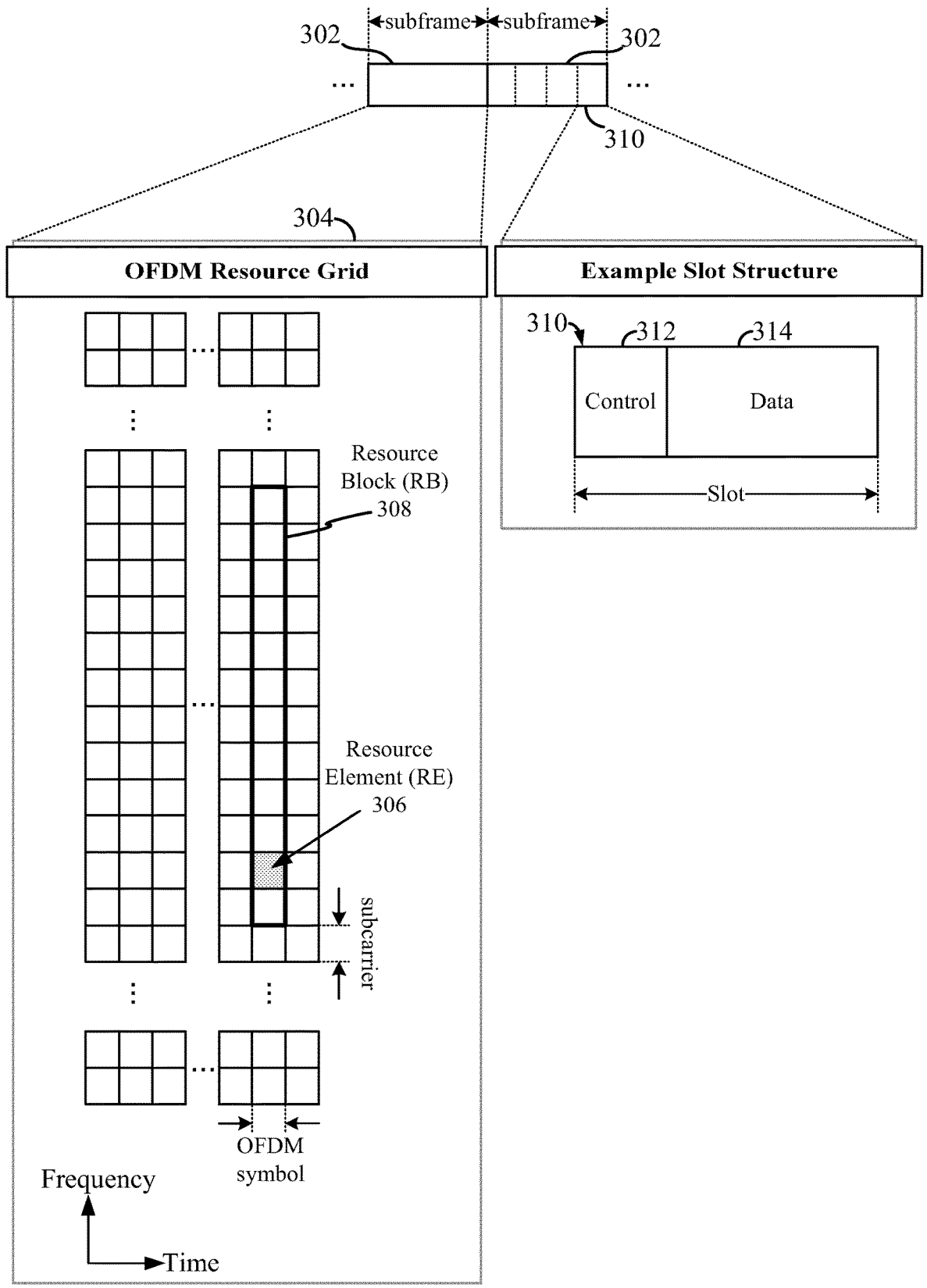
FIG. 3 illustrates an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, among other examples. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control or data channels within the RB 308.

In a DL transmission, the transmitting device (such as, the scheduling entity 108) may allocate one or more REs 306 (such as, within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); or a physical downlink control channel (PDCCH), among other examples, to one or more scheduled entities 106. The PCFICH provides information to assist a receiving device in receiving and decoding the PDCCH. The PDCCH carries downlink control information (DCI) including but not limited to power control commands, scheduling information, a grant, or an assignment of REs for DL and UL transmissions. The PHICH carries HARQ feedback transmissions such as an acknowledgment (ACK) or negative-acknowledgment (NACK). HARQ is a technique well-known to those of ordinary skill in the art, where the integrity of packet transmissions may be checked at the receiving side for accuracy, such as, utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may transmit a HARQ retransmission, which may implement chase combining, incremental redundancy, among other examples.

In an UL transmission, the transmitting device (such as, the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), such as, a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (such as, within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In a 5G network, a base station may configure UEs to periodically perform measurements of a beam for beam management or radio link monitoring, among other examples, and to periodically provide feedback reports carrying the measurements, or metrics or other information obtained based on the measurements, to the base station. For example, the base station may periodically transmit a channel station information (CSI) reference signal (CSI-RS) and a UE may perform measurements on the CSI-RS to provide CSI to the base station via CSI reports. The CSI may include, for example, channel quality information (CQI) and a reference signal received power (RSRP) for the beam. The serving base station or radio access network (RAN) may control the frequency with which the UE provides such feedback reports. However, the frequency with which such feedback reports are scheduled by the base station may be inadequate to maintain sufficient beam quality or reliability in scenarios in which channel conditions are changing rapidly. For instance, when a UE is in motion, obstacles or various environmental conditions may cause reception of a directional beam to quickly degrade.

According to various aspects, a UE may unilaterally initiate a request to the serving base station to change or enhance beam coverage at the UE. In some aspects, the UE may measure one or more characteristics of a directional beam transmitted by a base station and ascertain whether channel reliability for the beam should be improved. The UE may determine a channel reliability metric by taking one or more measurements of the beam and determine whether such measurements are above a minimum desired threshold. In some examples, if the UE determines that the channel reliability metric is below a threshold, the UE may transmit, to the base station, a request to adjust coverage of the beam (such as seeking coverage enhancements). For example, such a request may seek to adjust one or more transmit or receive parameters associated with the beam or channels transmitted therein. In one instance, the UE may switch to using a pre-defined set of coverage enhancement parameters or procedures either automatically after transmitting the request or upon receipt of a grant by the base station.

Examples of coverage enhancement parameters may include (but are not limited to) a repetition parameter, a time resource allocation parameter, a frequency resource allocation parameter, a payload size parameter, or other types of parameters associated with a received beam or channel(s) therein. The repetition parameter may indicate a quantity of repetitions for transmitting or receiving a particular type of communication, such as a reference signal (RS), a report, a PDCCH communication, a PDSCH communication, a PUCCH communication, a PUSCH communication, or the like. The time resource allocation parameter may indicate one or more time domain resources (such as, slots, symbols, subframes, or the like) for transmitting or receiving a particular type of communication, such as a reference signal, a report, a PDCCH communication, a PDSCH communication, a PUCCH communication, a PUSCH communication, or the like. The frequency resource allocation parameter may indicate one or more frequency domain resources (such as, resource blocks (RBs), resource elements (REs), subcarriers, component carriers, or the like) for transmitting or receiving a particular type of communication, such as a reference signal, a report, a PDCCH communication, a PDSCH communication, a PUCCH communication, a PUSCH communication, or the like. The payload size parameter may indicate a payload size limit for a particular type of communication, such as a reference signal, a report, a PDCCH communication, a PDSCH communication, a PUCCH communication, a PUSCH communication, or the like.

An example of coverage enhancement procedures may include increasing multi-path signal reception or processing at the UE. By increasing multi-path signal reception (such as, increase resources to capture more multi-path signals), the UE can seek to improve reliability of the beam or channels therein. Such coverage enhancements at the UE may automatically terminate after a predefined period of time, or upon receipt of a beam switch command from the base station.

Figure 4:
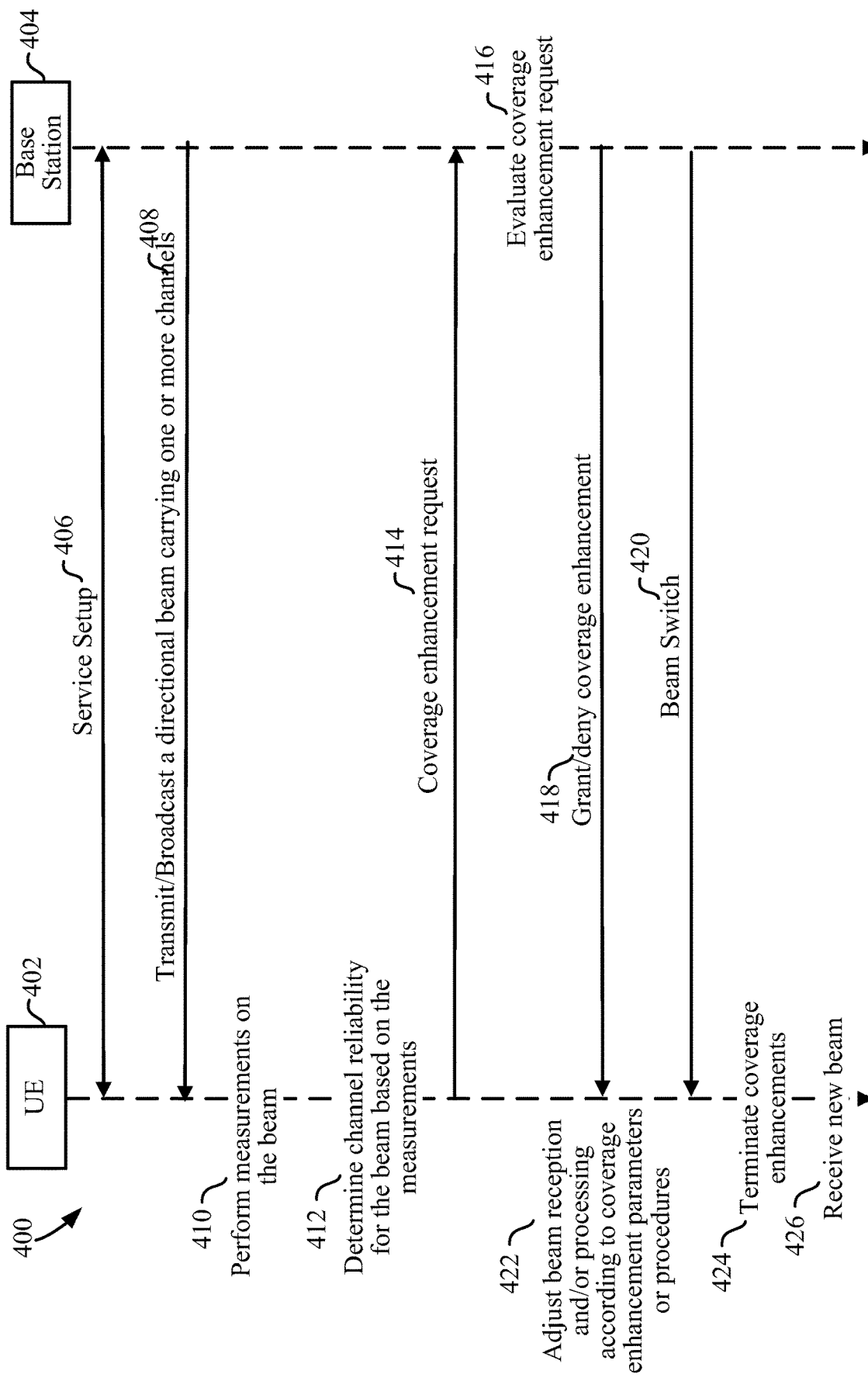
FIG. 4 illustrates an example system in which coverage enhancement for a beam transmitted by a base station may be initiated by a receiving user equipment (UE).

FIG. 4 illustrates an example system 400 in which coverage enhancement for a beam transmitted by a base station 404 may be initiated by a receiving UE 402. Wireless communication services may be set up 406 between the UE 402 and base station 404. For instance, such communication services may be compatible with a 5G wireless communication protocol. The base station 404 may transmit or broadcast a directional beam carrying one or more channels 408. In one example, such directional beam may be transmitted over a frequency range (FR2) or within a frequency band from 24.25 GHz to 52.6 GHz or greater.

The UE 402 may receive the directional beam and perform one or more measurements on the beam 410. Some examples of measurements that may be taken for the directional beam include a signal-to-noise ratio (SNR), a signal power, a reference signal received power (RSRP), a reference signal received quality (RSRQ), a received signal strength indicator, among others. Other examples of measurements that may be done to determine a channel reliability metric may be based on the quality of received symbols (based on log-likelihood ratio estimates) or a history of successfully decoding the channel.

Based on the beam measurements 410, the UE 402 may determine whether the one or more channels, carried by the beam, are reliable. For instance, if one or more of the beam measurements are greater than one or more respective thresholds, then the channel may be considered reliable. Otherwise, the UE 402 may consider the channel unreliable and transmits a coverage enhancement request 414 to the base station 404. The coverage enhancement request 414 may be transmitted unilaterally, adhoc, or asynchronously by the UE 402 (such as, not scheduled or otherwise controlled by the base station). This allows a UE to notify the serving base station of changes in beam reception conditions more quickly than waiting for a base station-scheduled feedback report, such as a CSI report.

In various examples, the coverage enhancement request 414 may seek to change one or more transmit or receive parameters or procedures for the directional beam. Such change in transmit or receive parameters or procedures may seek to improve channel reliability for the beam as received by the UE 402. For instance, coverage enhancement parameters may include a repetition parameter indicating a number of repetitions for transmitting or receiving a particular type of communication, a time resource allocation parameter for indicating one or more time domain resources (such as, slots, symbols, subframes, or the like) for transmitting or receiving a particular type of communication, a frequency resource allocation parameter for indicating one or more frequency domain resources (such as, resource blocks (RBs), resource elements (REs), subcarriers, component carriers, or the like) for transmitting or receiving a particular type of communication, a payload size parameter for indicating a payload size limit for a particular type of communication, a beam transmission power (which a serving base station may increase to try to improve reception), or other types of parameters associated with a received beam or channel(s) therein. Similarly, coverage enhancement procedures may include increasing signal processing resources to accurately decode a channel within the received directional beam, increasing multi-path signal processing, among other procedures.

In some implementations, the coverage enhancement parameters or procedures may be provided, identified or otherwise indicated to the UE 402 by the base station 404 during service setup 406. In other implementations, such coverage enhancement parameters or procedures may be pre-configured onto the UE 402 at an earlier time.

The base station 404 may evaluate 416 whether to grant or deny the coverage enhancement request 414. For example, if the base station 404 is about to issue a beam switch command or indication to the UE 402, it may deny the request or simply transmit the beam switch command or indication. Alternatively, if a beam switch is not possible or is scheduled to occur more than a threshold amount of time later after the request, then the base station 404 may grant the coverage enhancement request 418.

In some implementations, the UE 402 may adjust or modify its beam reception or processing of the beam according to a set of coverage enhancement parameters or procedures 422. In some such implementations, the UE 402 may immediately adjust the beam reception or processing responsive to transmitting, or otherwise based on, the coverage enhancement request 414. In another implementation, the UE 402 may await a grant from the base station 404 before adjusting the beam reception or processing, and adjust the beam reception or processing responsive to receiving, or otherwise based on, the grant. In various implementations, the coverage enhancement parameters or procedures may apply to a single channel or to multiple channels (such as, a group of channels) carried by the directional beam.

Subsequently, the UE 402 may receive a beam switch command 420 from the base station 404, which causes the UE 402 to terminate coverage enhancements 424 and receive the new beam 426. For instance, upon receipt of a beam change/switch command to a different beam, the UE 402 may terminate coverage enhancement and switches to the different beam. In some other implementations, the UE 402 may unilaterally terminate coverage enhancements upon expiration of a period of time. For example, the UE 402 may be pre-configured to terminate coverage enhancement after n seconds, where n is an integer number greater than zero.

Figure 5:
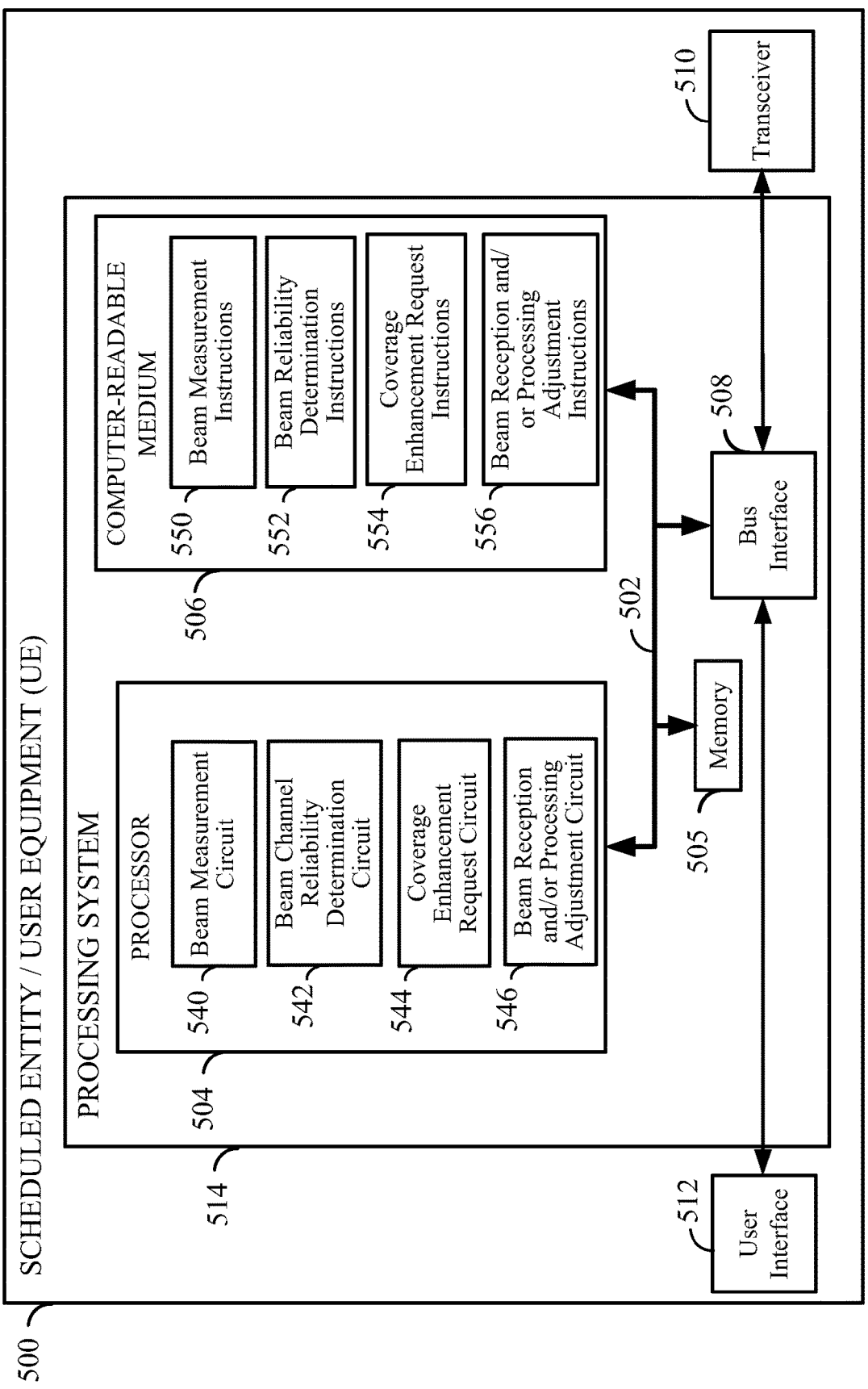
FIG. 5 is a conceptual diagram illustrating an example of a hardware implementation for an example scheduled entity (such as a UE) adapted to initiate coverage enhancement of a directional beam.

FIG. 5 is a conceptual diagram illustrating an example of a hardware implementation for an example scheduled entity or UE 500 adapted to initiate coverage enhancement of a directional beam. In some examples, the scheduled entity 500 may be a UE as illustrated in any one or more of FIGS. 1, 2, and 4.

The scheduled entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 500 may be configured to perform any one or more of the functions described herein. That is, the processor 504, as utilized in the scheduled entity 500, may be used to implement any one or more of the processes and procedures described and illustrated in FIGS. 1, 2, 3, 4 and 6.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 may provide a communication interface or means for wirelessly communicating with various other apparatus over a transmission medium. Depending upon the nature of the apparatus, a user interface 512 (such as, keypad, display, speaker, microphone, joystick) may also be provided.

In some aspects of the disclosure, the processor 504 may include a beam measurement circuit 540 configured to perform various functions, including, for example, measuring one or more characteristics of a beam. A beam channel reliability determination circuit 542 may serve to determine a channel reliability metric for a beam based on the measurements obtained for the one or more characteristics of the beam. For instance, the channel reliability determination circuit 542 may compare one or more of the beam measurement(s) to pre-configure, obtained, or desired thresholds to determine whether the beam is reliable. A coverage enhancement request circuit 544 may serve to formulate a request to a base station to enhance beam coverage. A beam reception or processing adjustment circuit 546 may serve to adjust reception or processing of beams to improve beam reliability (such as, without triggering an immediate beam switch from a serving base station).

The processor 504 may be responsible for managing the bus 502 and general processing, including the execution of software stored on the computer-readable medium 506. The software, when executed by the processor 504, causes the processing system 514 to perform the various functions described in FIGS. 4 and 6. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, among other examples, whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (such as, hard disk, floppy disk, magnetic strip), an optical disk (such as, a compact disc (CD) or a digital versatile disc (DVD)), a smart card, a flash memory device (such as, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include beam measurement software or instructions 550, beam reliability determination software or instructions 552, coverage enhancement request software or instructions 554, or beam reception or processing adjustment software or instructions 556. Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIG. 1, 2, 3, 4, or 6 and utilizing, for example, the processes or algorithms described herein.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIG. 1, 2, 4, or 6 and utilizing, for example, the processes or algorithms described herein.

Figure 6:
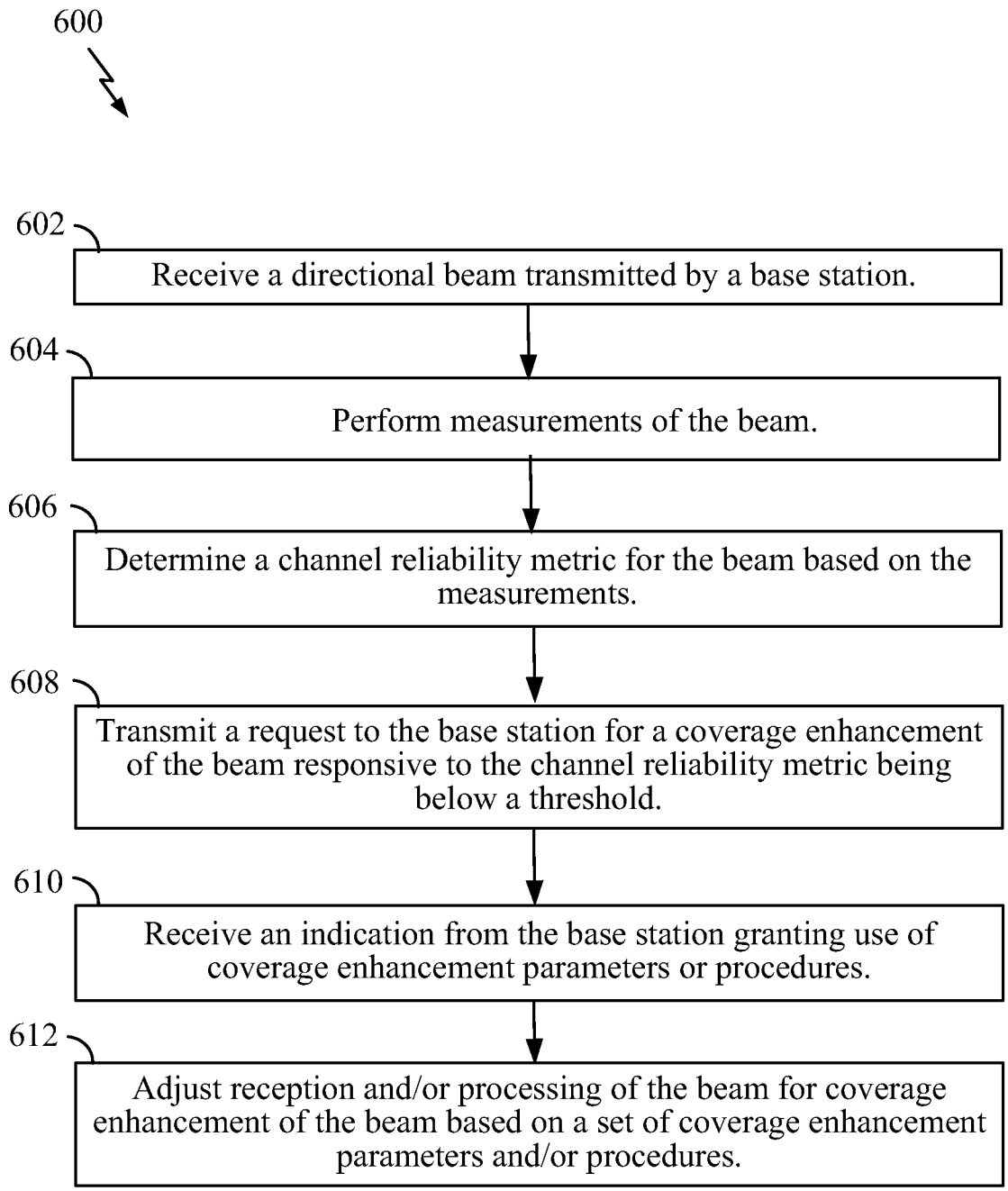
FIG. 6 is a flow chart illustrating an example method operational at a scheduled entity (such as a UE) to dynamically adjust coverage enhancement of a directional beam.

FIG. 6 is a flow chart illustrating an example method operational at a scheduled entity, for example, a UE to dynamically adjust coverage enhancement of a directional beam. In block 602, a directional beam transmitted or broadcasted by a base station may be received by the UE. In various examples, one or more channels are unicast channels transmitted by the base station within the beam, and the channels are in the 24 GHz to 53 GHz frequency range.

At block 604, the UE may perform measurements of the beam. At block 606, a channel reliability metric may be determined by the UE for the beam based on the measurements. In one example, in order to determine channel reliability for the beam, the UE may compare one or more beam measurements to corresponding thresholds associated with one or more beam characteristics (such as, signal power, signal-to-noise ratio, among others). If the one or more beam measurements are below one or more corresponding thresholds, then the channel may be deemed unreliable.

At block 608, responsive to channel reliability metric for the beam being below a threshold, the UE may transmit a request to the base station for a coverage enhancement of the beam. In one example, the request may be asynchronously transmitted from the UE to the base station (such as, on an adhoc basis). In one example, such request may be transmitted to the base station as part of uplink control information (UCI) from the UE.

After transmitting the coverage enhancement request, at block 610, the UE may receive an indication from the base station granting the UE use of coverage enhancement parameters or procedures. In various examples, the grant of the coverage enhancement request may be transmitted in a medium access control (MAC) control element (CE) or in downlink control information (DCI). In one example, the grant may specify a subset of the plurality of coverage enhancement parameters or procedures to adjust reception or processing of the beam. In another example, the UE may have default coverage enhancement parameters or procedures to implement on its own.

At block 612, the UE may then adjust reception or processing of the beam for coverage enhancement of the beam based on a set of coverage enhancement parameters or procedures. In one implementation, the UE may adjust reception or processing of the beam before a grant to the request is received from the base station. According to one aspect, the UE may store a plurality of coverage enhancement parameters or procedures. These parameters or procedures may be obtained, for example, when service is established with a serving RAN or the base station. One example of adjusting reception or processing of the beam may include transmitting channel state information (CSI) with additional information related to channel reliability for one or more channels within the beam. For instance, the additional information related to channel reliability may include an additional scheduling request SR for transmissions. Another example of adjusting reception or processing of the beam may include increasing a frequency of acknowledgements to the base station for one or more channels within the beam. Examples of such one or more channels includes a physical downlink control channel (PDCCH) and a physical downlink shared channel (PDSCH).

The UE may terminate the coverage enhancement of the beam upon the occurrence of one of: (a) elapsing of a preconfigured duration of time; or (b) receiving an indication from the base station to terminate the coverage enhancement of the beam. In one example, the UE may have a preconfigured time duration for the coverage enhancements. After initiating coverage enhancement, the UE may terminate coverage enhancement after that preconfigured duration of time has elapsed. In another example, the base station may transmit a termination indicator to the UE, which causes the UE to terminate coverage enhancement.

In one implementation, the UE may receive a beam change indication from the base station to change reception to a different beam. That is, the base station may periodically or sporadically send such beam change indication or command to the UE to try to improve channel reliability at the UE. In other instance, the base station may send such beam change indication or command at least partially in response to the coverage enhancement request from the UE. The UE may terminate the coverage enhancement of the beam based on changing reception to the different beam.

Figure 7:
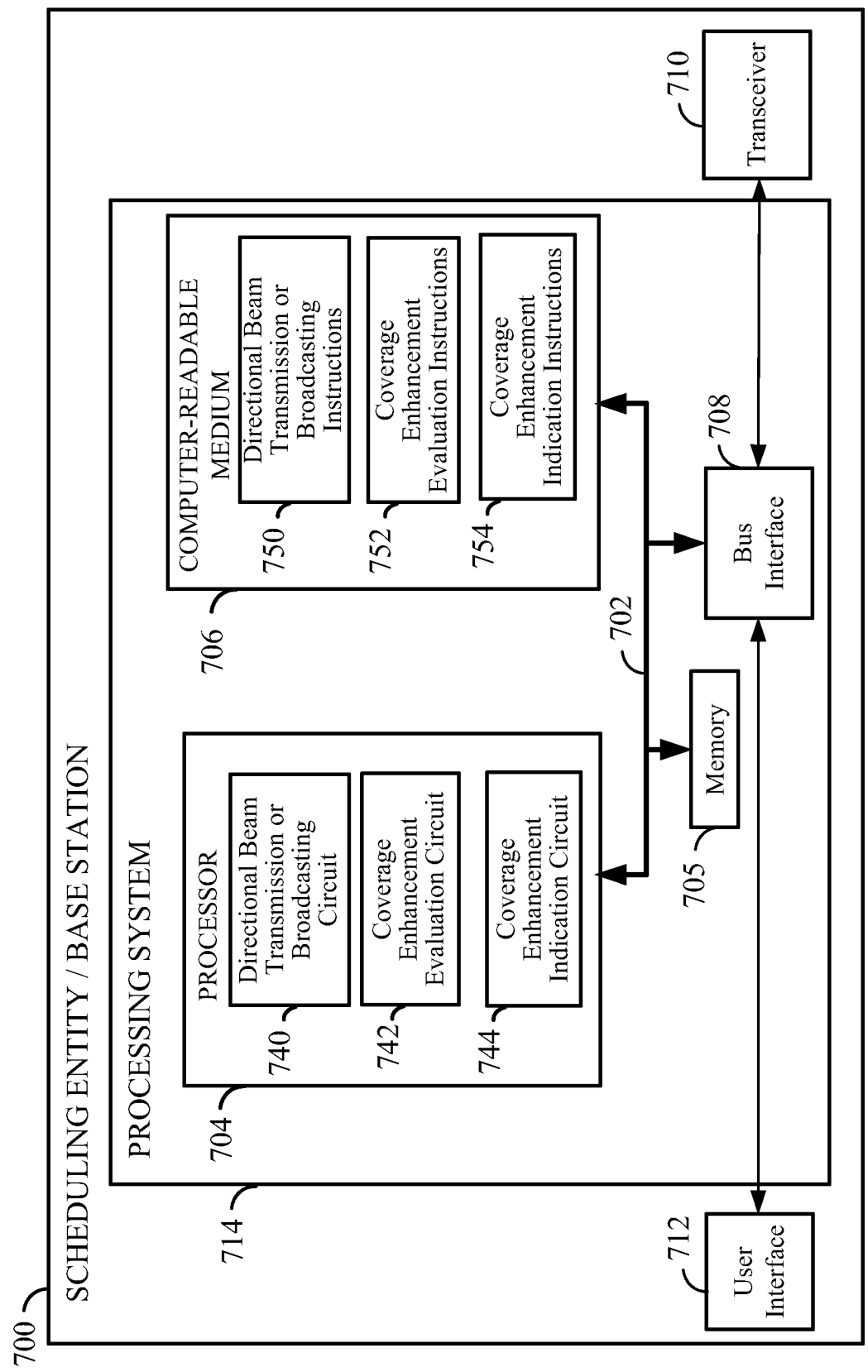
FIG. 7 is a block diagram illustrating an example of a hardware implementation for a scheduling entity (such as a base station) adapted to facilitate coverage enhancement of a directional beam.

FIG. 7 is a block diagram illustrating an example of a hardware implementation for a scheduling entity or base station adapted to facilitate coverage enhancement of a directional beam. For example, the scheduling entity or base station 700 (such as, gNodeB, managed mobile network node, RAN entity, or network node) may perform any of the functions illustrated and described in FIGS. 1, 2, and 4.

The scheduling entity or base station 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity or base station 700 may be configured to perform any one or more of the functions described herein. That is, the processor 704, as utilized in the scheduling entity or base station 700, may be used to implement any one or more of the processes and procedures described in FIGS. 1, 2, and 4 and further illustrated in the flow diagram of FIG. 8, to be discussed later.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (such as, keypad, display, speaker, microphone, joystick) may also be provided.

In some aspects of the disclosure, the processor 704 may include a directional beam broadcasting circuit 740 configured for various functions, including, for example, generating and transmitting one or more directional beams to one or more UEs. A coverage enhancement evaluation circuit 742 may serve to receive coverage enhancement requests and evaluate whether to grant or deny such requests. A coverage enhancement indication circuit 744 may serve to provide an indication of whether a coverage enhancement request is granted or denied as well as an indication of which coverage enhancement parameters or processes should be used by a requesting UE.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (such as, hard disk, floppy disk, magnetic strip), an optical disk (such as, a compact disc (CD) or a digital versatile disc (DVD)), a smart card, a flash memory device (such as, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may include directional beam transmission or broadcasting software or instructions 750, coverage enhancement evaluation software or instructions 752, or coverage enhancement indication software or instructions 754. Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIG. 1, 2, 3, 4, or 8 and utilizing, for example, the processes or algorithms described herein.

Figure 8:
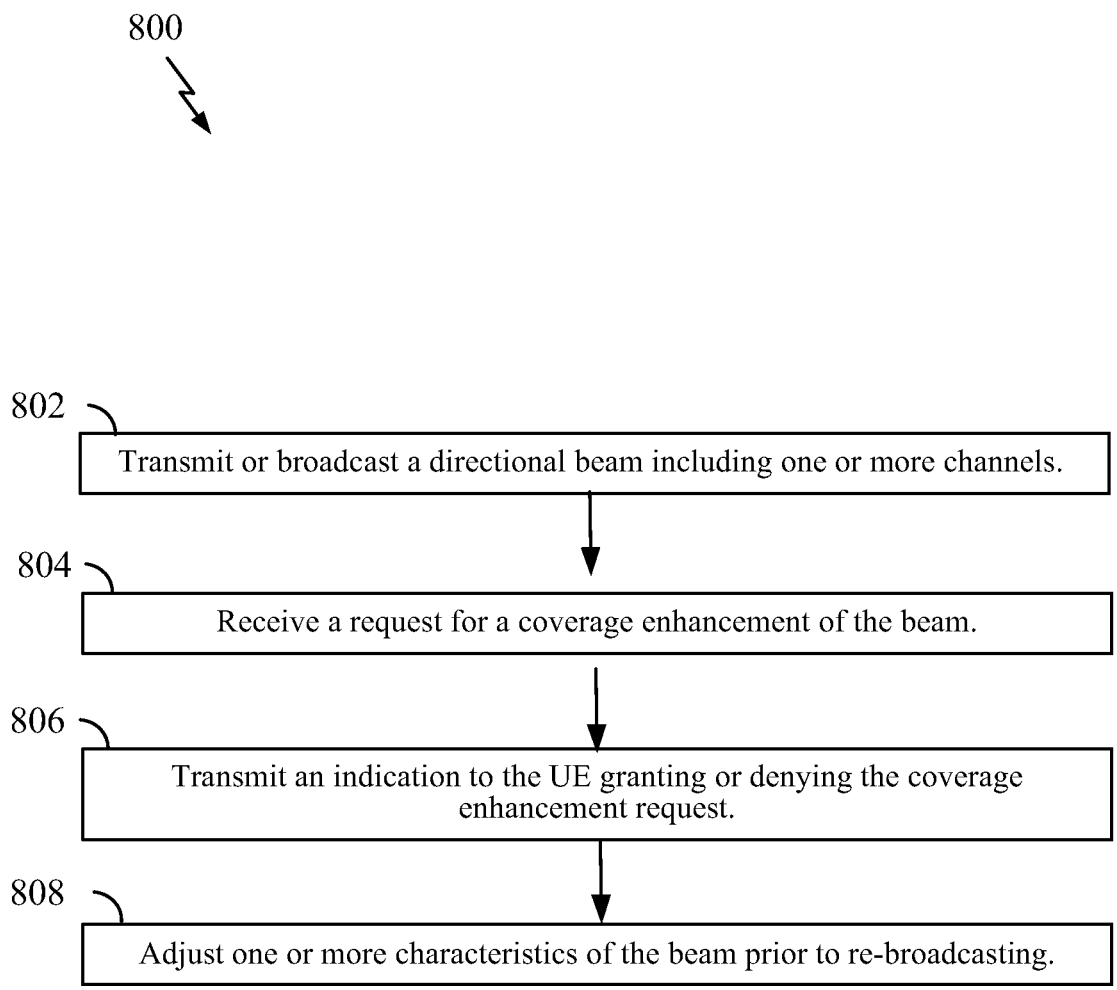
FIG. 8 is a flow chart illustrating an example method operational at a scheduling entity (such as a base station) to facilitate UE-initiated coverage enhancement of a directional beam.

FIG. 8 is a flow chart illustrating an example method 800 operational at a scheduling entity or a base station to facilitate UE-initiated coverage enhancement of a directional beam. At block 802, the base station may transmit or broadcast a directional beam including one or more channels. In one example, the one or more channels may be transmitted or broadcasted as unicast channels by the base station within the beam. In some instances, the unicast channels may be in the 24 GHz to 53 GHz frequency range. Examples of such one or more channels include a physical downlink control channel (PDCCH) and a physical downlink shared channel (PDSCH).

At block 804, the base station may receive, from a user-equipment (UE), a request for a coverage enhancement of the beam. In one example, such request may be received as part of an uplink control information (UCI) from the UE.

At block 806, the base station may then transmit an indication to the UE granting or denying the coverage enhancement request. In various examples, the granting or denial of the coverage enhancement request may be transmitted in a medium access control (MAC) control element (CE) or in downlink control information (DCI). In one example, the base station may deny the coverage enhancement request if a beam switch is scheduled to occur within a threshold amount of time.

At block 808, if the base station grants the request, it may adjust one or more characteristics of the beam prior to retransmission or re-broadcasting. In one example, the base station may subsequently receive a channel state information with additional information related to channel reliability for the one or more channels from the UE upon granting of the request.

According to one aspect, the base station may transmit an indication to the requesting UE specifying a subset of the plurality of coverage enhancement parameters or procedures to adjust reception or processing of the beam. These parameters or procedures may be obtained, for example, when service is established with a serving RAN or the base station. One example of adjusting reception or processing of the beam may include transmitting channel state information (CSI) with additional information related to channel reliability for one or more channels within the beam. For instance, the additional information related to channel reliability may include an additional scheduling request SR for transmissions. Another example of adjusting reception or processing of the beam may include increasing a frequency of acknowledgements to the base station for one or more channels within the beam.

Termination of beam coverage enhancement may be accomplished in a number of ways. For example, the base station may transmit an indication to the UE to terminate coverage enhancement. In another example, the base station may transmit a beam change/switch indication to the UE to change reception to another beam-formed signal including the one or more channels; this also causes termination of the coverage enhancement.

The following provides an overview of the present disclosure:

Aspect 1: A method for wireless communication by a user equipment (UE), comprising: receiving a directional beam transmitted by a base station; performing measurements of the beam; determining a channel reliability for the beam based on the measurements; transmitting a request to the base station for a coverage enhancement of the beam responsive to the channel reliability metric for the beam being below a threshold; and adjusting reception or processing of the beam for coverage enhancement of the beam based on a set of coverage enhancement parameters or procedures.

Aspect 2: The method of aspect 1, further comprising: receiving an indication from the base station granting the UE use of coverage enhancement parameters or procedures.

Aspect 3: The method of any of aspects 1 or 2, wherein adjusting reception or processing of the beam occurs before a grant to the request is received from the base station.

Aspect 4: The method of any of aspects 1, 2, or 3, wherein the request is asynchronously transmitted from the UE to the base station.

Aspect 5: The method of any of aspects 1, 2, 3, or 4, wherein determining channel reliability for the beam includes: comparing one or more beam measurements to corresponding thresholds associated with one or more beam characteristics.

Aspect 6: The method of any of aspects 1, 2, 3, 4, or 5, wherein one or more unicast channels are transmitted by the base station within the beam.

Aspect 7: The method of any of aspects 1, 2, 3, 4, 5, or 6, wherein the unicast channels are in the 24 GHz to 53 GHz frequency range.

Aspect 8: The method of any of aspects 1, 2, 3, 4, 5, 6, or 7, wherein adjusting reception or processing of the beam includes: transmitting channel state information with additional information related to channel reliability for one or more channels within the beam.

Aspect 9: The method of any of aspects 1, 2, 3, 4, 5, 6, 7, or 8, wherein adjusting reception or processing of the beam includes: increasing a frequency of acknowledgements to the base station for one or more channels within the beam.

Aspect 10: The method of any of aspects 1, 2, 3, 4, 5, 6, 7, 8, or 9, further comprising: storing a plurality of coverage enhancement parameters or procedures at the UE; and receiving an indication from the base station specifying a subset of the plurality of coverage enhancement parameters or procedures to adjust reception or processing of the beam.

Aspect 11: The method of any of aspects 1, 2, 3, 4, 5, 6, 7, 8, 9, or 10, further comprising: further comprising terminating the coverage enhancement of the beam upon the occurrence of one of: elapsing of a preconfigured duration of time; or receiving an indication from the base station to terminate the coverage enhancement of the beam.

Aspect 12: The method of any of aspects 1, 2, 3, 4, 5, 6, 7, 8, 9, or 10, further comprising: receiving a beam change indication from the base station to change reception to a different beam; and terminating the coverage enhancement of the beam based on changing reception to the different beam.

Aspect 13: A wireless user equipment (UE), comprising: at least one processor; and at least one memory communicatively coupled with the at least one processor and storing processor-readable code that, when executed by the at least one processor, is configured to: receive a directional beam transmitted by the base station; perform measurements of the beam; determine a channel reliability metric for the beam based on the measurements; transmit a request to the base station for a coverage enhancement of the beam responsive to the channel reliability metric for the beam being below a threshold; and adjust reception or processing of the beam according to a set of coverage enhancement parameters or procedures.

Aspect 14: The UE of aspect 13, wherein the at least one memory further including processor-readable code that is configured to: receive an indication from the base station granting the UE use of coverage enhancement parameters or procedures.

Aspect 15: The UE of aspect 13 or 14, wherein adjusting reception or processing of the beam occurs before a grant to the request is received from the base station.

Aspect 16: The UE of aspect 13, 14, or 15, wherein the request is transmitted from the UE to the base station is asynchronously transmitted.

Aspect 17: The UE of aspect 13, 14, 15, or 16, wherein determining channel reliability for the beam includes: comparing one or more beam measurements to corresponding thresholds associated with one or more beam characteristics.

Aspect 18: The UE of aspect 13, 14, 15, 16, or 17, wherein one or more unicast channels are transmitted by the base station within the beam.

Aspect 19: The UE of aspect 13, 14, 15, 16, 17, or 18, wherein the unicast channels are in the 24 GHz to 53 GHz frequency range.

Aspect 20: A method for wireless communication by a base station, comprising: transmitting a directional beam including one or more channels; receiving, from a user equipment (UE), a request for coverage enhancement of the beam; and transmitting an indication to the UE granting or denying the coverage enhancement request.

Aspect 21: The method of aspect 20, further comprising: adjusting one or more characteristics of the beam prior to retransmission.

Aspect 22: The method of aspect 20 or 21, further comprising: determining to deny the coverage enhancement request if a beam switch is scheduled to occur within a threshold amount of time.

Aspect 23: The method of aspect 20, 21, or 22, wherein the one or more channels are unicast channels transmitted by the base station within the beam.

Aspect 24: The method of aspect 20, 21, 22, or 23, wherein the unicast channels are in the 24 GHz to 53 GHz frequency range.

Aspect 25: The method of aspect 20, 21, 22, 23, or 24, further comprising: receiving a channel state information with additional information related to channel reliability for the one or more channels from the UE in response to granting of the request.

Aspect 26: The method of aspect 20, 21, 22, 23, 24 or 25, further comprising: transmitting an indication from the base station specifying a subset of the plurality of coverage enhancement parameters or procedures to adjust reception or processing of the beam.

Aspect 27: The method of aspect 20, 21, 22, 23, 24, 25, or 26, further comprising: transmitting an indication to the UE to terminate coverage enhancement of the beam.

Aspect 28: The method of aspect 20, 21, 22, 23, 24, 25, 26, or 27, further comprising: transmitting a beam change indication to the UE to change reception to another beam-formed signal including the one or more channels.

Aspect 29: A base station, comprising: at least one processor; and at least one memory communicatively coupled with the at least one processor and storing processor-readable code that, when executed by the at least one processor, is configured to: transmit a directional beam including one or more channels; receive, from a user equipment (UE), a request seeking coverage enhancement of the beam; and transmit an indication to the UE granting or denying the coverage enhancement request.

Aspect 30: The base station of aspect 29, wherein the at least one memory further including processor-readable code that is configured to: adjust one or more characteristics of the beam prior to retransmission; and transmit an indication from the base station specifying a subset of the plurality of coverage enhancement parameters or procedures to adjust reception or processing of the beam.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a user equipment (UE), comprising:
    receiving a beam, directed to the UE, transmitted by a base station;
    performing measurements of the beam;
    determining a channel reliability metric for the beam based on comparing one or more of the measurements, or one or more metrics based on one or more of the measurements, to corresponding thresholds associated with one or more beam characteristics;

transmitting, to the base station, a request to enhance a coverage of the beam responsive to the channel reliability metric being below a threshold, without triggering a beam change; and
adjusting processing of the beam to enhance the coverage of the beam based on a plurality of coverage enhancement parameters.

2. The method of claim 1, further comprising:
receiving an indication from the base station granting the UE use of the plurality of coverage enhancement parameters.

3. The method of claim 1, wherein the adjusting of the processing of the beam occurs before a grant in response to the request is received from the base station.

4. The method of claim 1, wherein the transmission of the request is asynchronous.

5. The method of claim 1, wherein the beam carries one or more unicast channels.

6. The method of claim 5, wherein the unicast channels are in the 24 GHz to 53 GHz frequency range.

7. The method of claim 1, wherein the adjusting of the processing of the beam includes:
transmitting channel state information with additional information related to channel reliability for one or more channels within the beam.

8. The method of claim 1, wherein the adjusting of the processing of the beam includes:
increasing a frequency of acknowledgements to the base station for one or more channels within the beam.

9. The method of claim 1, further comprising:
storing the plurality of coverage enhancement parameters at the UE; and
receiving an indication from the base station specifying a subset of the plurality of coverage enhancement parameters to adjust the processing of the beam.

10. The method of claim 1, further comprising:
terminating the coverage enhancement of the beam upon the occurrence of one of:
elapsing of a preconfigured duration of time; or
receiving an indication from the base station to terminate the coverage enhancement of the beam.

11. The method of claim 1, further comprising:
receiving a beam change indication from the base station to change reception to a different beam; and
terminating the coverage enhancement of the beam based on changing reception to the different beam.

12. A wireless user equipment (UE), comprising:
at least one processor; and
at least one memory communicatively coupled with the at least one processor and storing processor-readable code that, when executed by the at least one processor, is configured to:
receive a beam, directed to the UE, transmitted by a base station;
perform measurements of the beam;
determine a channel reliability metric for the beam based on comparing one or more of the measurements, or one or more metrics based on one or more of the measurements, to corresponding thresholds associated with one or more beam characteristics;
transmit, to the base station, a request to enhance a coverage of the beam responsive to determining that the channel reliability metric for the beam is below a threshold, without triggering a beam change; and
adjust processing of the beam to enhance the coverage of the beam according to a plurality of coverage enhancement parameters.

13. The UE of claim 12, wherein the at least one memory further including processor-readable code that is configured to:
receive an indication from the base station granting the UE use of the plurality of coverage enhancement parameters.

14. The UE of claim 12, wherein the adjusting of the processing of the beam occurs before a grant in response to the request is received from the base station.

15. The UE of claim 12, wherein the transmission of the request is asynchronous.

16. The UE of claim 12, wherein the beam carries one or more unicast channels.

17. The UE of claim 16, wherein the unicast channels are in the 24 GHz to 53 GHz frequency range.

18. A method for wireless communication by a base station, comprising:
transmitting a beam, directed to a user equipment (UE), carrying one or more channels;
receiving, from the UE, a request to enhance a coverage of the beam, without triggering a beam change; and
transmitting an indication to the UE granting or denying the request to enhance the coverage of the beam based on a plurality of coverage enhancement parameters.

19. The method of claim 18, further comprising:
adjusting one or more characteristics of the beam prior to retransmission.

20. The method of claim 18, further comprising:
determining to deny the request to enhance the coverage if a beam switch is scheduled to occur within a threshold amount of time.

21. The method of claim 18, wherein the one or more channels are unicast channels.

22. The method of claim 21, wherein the unicast channels are in the 24 GHz to 53 GHz frequency range.

23. The method of claim 18, further comprising:
receiving, from the UE, a channel state information with additional information related to channel reliability for the one or more channels in response to granting of the request.

24. The method of claim 18, further comprising:
transmitting, to the UE, an indication specifying a subset of the plurality of coverage enhancement parameters to adjust reception or processing of the beam.

25. The method of claim 18, further comprising:
transmitting an indication to the UE to terminate coverage enhancement of the beam.

26. The method of claim 18, further comprising:
transmitting a beam change indication to the UE to change reception to another beam-formed signal including the one or more channels.

27. A base station, comprising:
at least one processor; and
at least one memory communicatively coupled with the at least one processor and storing processor-readable code that, when executed by the at least one processor, is configured to:
transmit a beam, directed to a user equipment (UE), carrying one or more channels;
receive, from the UE, a request to enhance a coverage of the beam, without triggering a beam change; and
transmit an indication to the UE granting or denying the request to enhance the coverage of the beam based on a plurality of coverage enhancement parameters.

28. The base station of claim 27, wherein the at least one memory further including processor-readable code that is configured to:

adjust one or more characteristics of the beam prior to retransmission; and transmit, to the UE, an indication specifying a subset of the plurality of coverage enhancement parameters to adjust reception or processing of the beam.

\* \* \* \* \*